US009804750B2

(12) United States Patent
B. et al.

(10) Patent No.: US 9,804,750 B2
(45) Date of Patent: Oct. 31, 2017

(54) TEXTBOX ASSOCIATED WITH DEVICE NATIVE FEATURES

(71) Applicants: Ellaiyaraja B., Karnataka (IN); Stephen A Burdeau, Malvern, PA (US); Raju Yadava, Bangalore Karnataka (IN); Saurabh Sood, Bangalore Karnataka (IN)

(72) Inventors: Ellaiyaraja B., Karnataka (IN); Stephen A Burdeau, Malvern, PA (US); Raju Yadava, Bangalore Karnataka (IN); Saurabh Sood, Bangalore Karnataka (IN)

(73) Assignee: Unisys Corporation, Blue Bell, PA (US)

(*) Notice: Subject to any disclaimer, the term of this patent is extended or adjusted under 35 U.S.C. 154(b) by 293 days.

(21) Appl. No.: 14/601,380

(22) Filed: Jan. 21, 2015

(65) Prior Publication Data

US 2016/0210007 A1    Jul. 21, 2016

(51) Int. Cl.
| | | |
|---|---|---|
| *G06F 15/00* | (2006.01) |
| *G06F 13/00* | (2006.01) |
| *G06F 3/0484* | (2013.01) |
| *G06F 17/30* | (2006.01) |
| *G06F 3/0482* | (2013.01) |

(52) U.S. Cl.
CPC .......... *G06F 3/0484* (2013.01); *G06F 3/0482* (2013.01); *G06F 17/30879* (2013.01)

(58) Field of Classification Search
CPC .............................. G06Q 20/02; G06Q 30/02
USPC .................................. 715/851–853, 740–743
See application file for complete search history.

(56) References Cited

U.S. PATENT DOCUMENTS

| | | | | |
|---|---|---|---|---|
| 8,340,635 | B2 * | 12/2012 | Herz ....................... H04L 63/08 |
| | | | | 455/411 |
| 8,789,144 | B2 * | 7/2014 | Mazzaferri ......... G06F 21/6218 |
| | | | | 726/27 |
| 9,058,375 | B2 * | 6/2015 | Rosen ............... G06F 17/30598 |
| 9,124,846 | B2 * | 9/2015 | Hansen ................ H04N 1/4413 |
| 9,361,606 | B2 * | 6/2016 | Hertel |
| 2012/0084663 | A1 * | 4/2012 | Momchilov .......... G06F 3/0481 |
| | | | | 715/744 |

* cited by examiner

*Primary Examiner* — Kevin Nguyen
(74) *Attorney, Agent, or Firm* — Robert P. Marley; James E. Goepel (57) ABSTRACT

A user interface is provided next to a textbox in a cross-platform mobile application to access one or more native features of a mobile device. Once the user interface is selected by a user, the mobile application operates to access one or more associated native feature of the mobile device and retrieve data to automatically populate it on the textbox in the mobile application.

20 Claims, 9 Drawing Sheets

*FIG. 9*

TEXTBOX ASSOCIATED WITH DEVICE NATIVE FEATURES

TECHNICAL FIELD

The present disclosure relates generally to using a textbox in a mobile application associated with one or more native features of a mobile device. In particular, the present disclosure relates to retrieval of data on a textbox in a cross-platform mobile application, using a native feature of a mobile device.

BACKGROUND

Textboxes are widely used as a data entry method where a user can enter a text-based value via an input device. Textboxes are typically used in a mobile application as well. Textboxes in the mobile applications can be used to enter or input information that is obtained by one or more native features of a mobile device, such as a device camera, a contacts list, and a device GPS module.

Mobile applications can typically be categorized as native applications and web applications. Native applications are application programs that are developed for use on a particular platform or device, and thus need to be adapted for different devices. The native applications can take full advantages of all of the device native features. In contrast, web applications, or browser applications, are applications in which all or some parts of the software are downloaded from the Web each time it is run and can usually be accessed from all Web-capable mobile devices regardless of a type of device platform. Thus, the web applications can be run on multiple platforms. However, typically web applications have limited capability to access native features of the mobile device. Therefore, if a user wants to enter a value in a textbox in a web application and the value is associated with a native feature of a device, the user needs to separately access the native feature of the device to obtain the value and enter the value on the textbox in the web application, which makes the input process inconvenient and time-consuming.

SUMMARY

In accordance with the following disclosure, the above and other issues are addressed by the following:

In a first aspect, a method is provided to retrieve data on a textbox in a cross-platform mobile application using a native feature of a mobile device. The method may include displaying a user interface adjacent a textbox in the cross-platform mobile application, the user interface associated with a predetermined native feature of the mobile device, receiving a user input through the user interface, accessing the predetermined native feature of the mobile device, and displaying information associated with the predetermined native feature of the mobile device in the textbox.

In a second aspect, a system is provided to retrieve data using a native feature of a mobile device in a cross-platform mobile application. The system may include at least one processing unit, a display screen, and memory storing computing executable instructions that, when executed by the at least one processing unit, cause the at least one processing unit to display a user interface adjacent a textbox on the display screen, the user interface associated with a predetermined native feature of the mobile device, receive a user selection of the user interface, access the predetermined native feature of the mobile device, and display information associated with the predetermined native feature of the mobile device in the textbox.

In a third aspect, a computer storage medium is provided for encoding computer executable instructions that, when executed by at least one processor, perform a method of retrieving data in a cross-platform mobile application. The method may include displaying a user interface adjacent a textbox in the cross-platform mobile application, the user interface associated with a predetermined native feature of the mobile device, receiving a user input through the user interface, accessing the predetermined native feature of the mobile device, and displaying information associated with the predetermined native feature of the mobile device in the textbox.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to implementation of a mobile application that includes a textbox (such as the box typically rendered by a web browser due to an HTML input element) for entering a text-based value. In example aspects, the value is intended to be obtained from one or more native features of a mobile device. A user can typically access the device native features to obtain the value and then enter the obtained value on the textbox. Embodiments of the present teachings, however, provide systems and methods that directly retrieve data from the device native features and automatically populate or display the retrieved value on the textbox. The user interface for performing the automatic retrieval of data from the device native features is accompanied by the textbox in the mobile application. The mobile application is created to be compatible with multiple mobile platforms.

Figure 1:
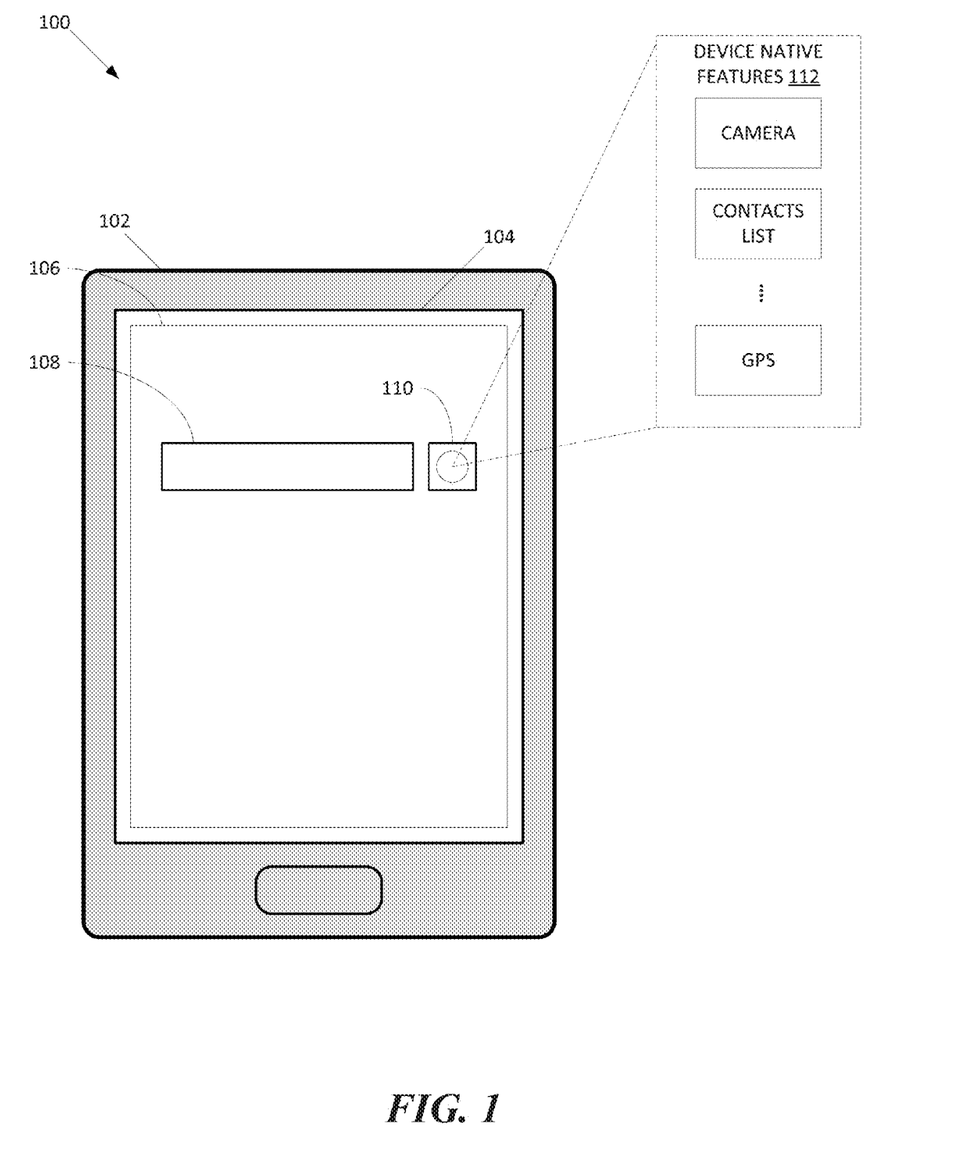
FIG. 1 is a diagrammatic view of an example embodiment of a mobile device implementing a system for retrieving data onto a textbox in a mobile application by means of one or more native features of the mobile device.

FIG. 1 is a diagrammatic view of an example embodiment of a mobile device implementing a system 100 for retrieving data onto a textbox in a mobile application by means of one or more native features of the mobile device. The system 100 includes a mobile device 102 including a display screen 104, a mobile application 106, a textbox 108, and a user interface element 110 for invoking one or more native features 112 of the mobile device 102.

The mobile device 102 may be any type of mobile computing device that can support data communications via software, firmware and/or hardware. An example architecture of the mobile device 102 is described and illustrated in more detail with reference to FIG. 9. The mobile device 102 may include wireless telephones, cellular telephones, satellite telephones, personal digital assistants (PDA), pocket personal computers, smart phones, tablets, handsets, portable gaming systems, customized hardware, and other mobile technologies capable of transmitting data.

The display screen 104 may be part of the mobile device 102 and configured to display output of the mobile application 106. In some embodiments, the display screen 104 may be a touch-sensitive display screen configured to gather user input through a user's touch with a finger or stylus on the screen and present the device's output thereon. In alternative embodiments, other input mechanisms may be used as well, such as a pointing device and/or keyboard.

The mobile application 106 is a computer program at least partially running on and hosted by the mobile device 102 to offer one or more functions. As described, the mobile application 106 may be a cross-platform mobile application that executes on any of a variety of operating platforms and is configured to access native device features 112 of the mobile device 102. The mobile application 106 can perform a variety of functions by accessing the native features 112 of the mobile device 102. Examples of the functions offered by the mobile application 106 include a barcode reader, a retrieval of contact list, a geolocation service, or other information retrieval mechanisms such as email, calendar, stock market and weather information, and other categories such as mobile games, factory automation, location-based services, banking, order-tracking, and ticket purchases.

In the embodiment shown, the textbox 108 is included in the mobile application 106. The textbox 108 is, in the example shown, a graphical control element intended to enable a user to input text information to be used by the mobile application 106, as well as to display, as an output, the same text information or other information processed in the mobile application 106 thereon. As described herein, the textbox 108 may be used to display a text-based value obtained by or from one or more native features 112 of the mobile device 102 accessed by a user selection of the user interface element 110. In other embodiments, the textbox 108 can be configured to present a value in different types or formats.

Figure 5:
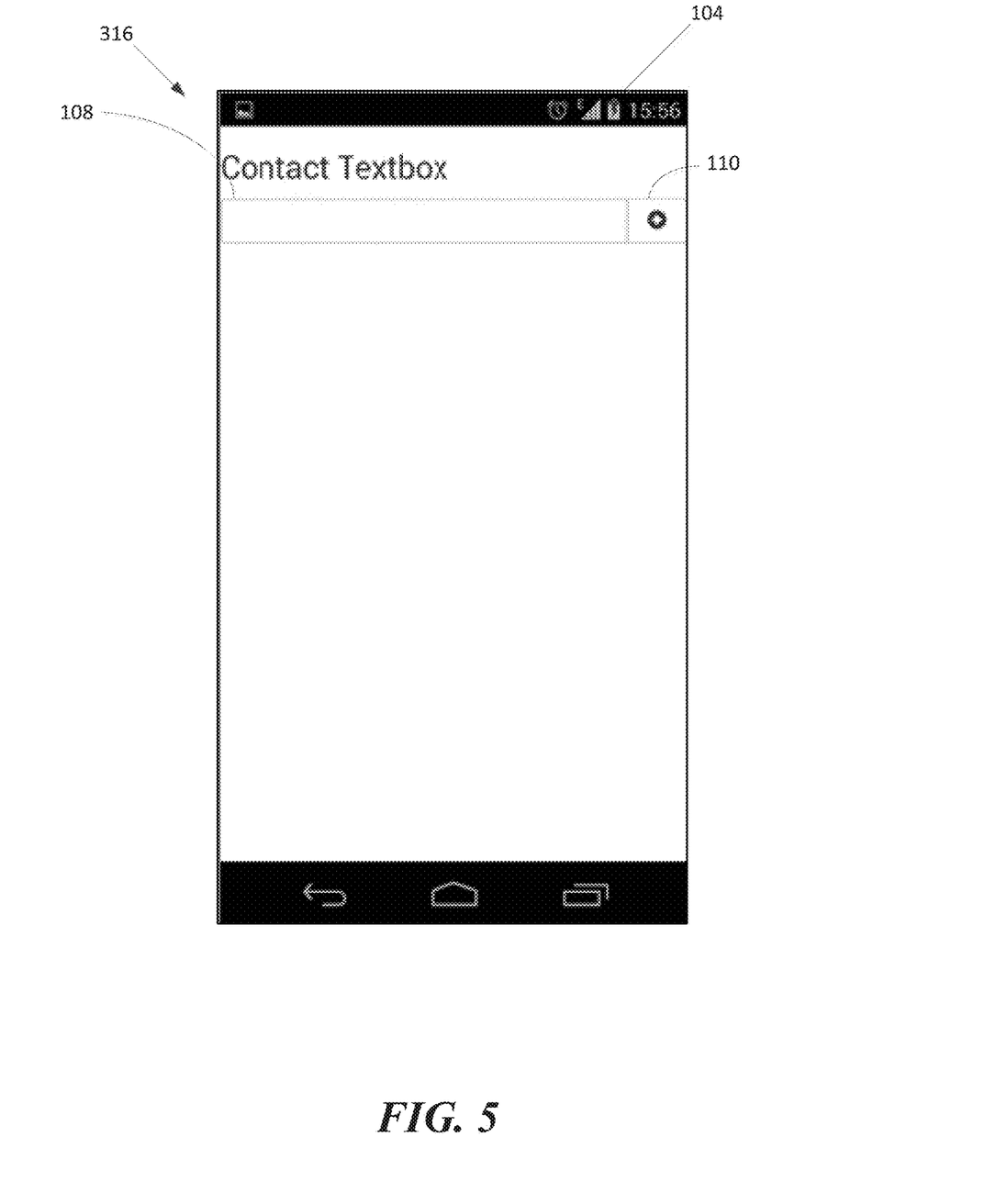
FIG. 5 is a schematic screenshot illustrating another example of the mobile application implemented as a contact search application.

The user interface element 110 is configured to receive a user request for invoking the native features 112 of the mobile device 102. The user can interact with the user interface element 110 to input the user request to the mobile application 106. In the embodiments where the display screen 104 is a touch-sensitive display screen, the user can input the request by tapping the user interface element 110. In some embodiments, the user interface element 110 can include a graphical icons, visual indicators, and/or text-based interfaces and have different designs in accordance with functionalities of the user interface element 110, the textbox 108, and/or the mobile application 106. For example, the user interface element 110 can accompany the term "SCAN" where the textbox 108 (or the mobile application 106) is at least partially configured to perform a barcode scanner function (FIG. 3) by accessing the camera of the mobile device 102. In other embodiments where the textbox 108 (or the mobile application 106) is at least partially configured to search and/or retrieve contacts from the contacts list of the mobile device 102, the user interface element 110 can be designed with an add icon or button (e.g., a cross or plus shape) (FIG. 5).

In some embodiments, the user interface element 110 can be arranged adjacent the textbox 108. In the depicted embodiment, the user interface element 110 is located next to the textbox 108 on the right side thereof. In other embodiments, the user interface element 110 can be arranged in different locations and/or manners. Although the Figures of the present disclosure show one textbox and one user interface in the mobile application, there can be more than one textbox and user interface in the mobile application performing the function in accordance with the principles of the present disclosure.

As referred to herein, the native features 112 of the mobile device 102 are the features or functions that are incorporated into and integral with the mobile device 102. Examples of the native features 112 include hardware systems such as a camera, a barcode scanner, a GPS system and compass, or geolocation information, or software features native to the mobile device 102, such as a contacts list (including phone numbers, email addresses, social network information), push notifications configured to send a notification alert that pops up on the mobile device to inform users of different types of updates or information, or retrieval of device information (e.g., device version, device identification and platform information).

As described herein, the mobile application 106 includes the textbox 108 and the user interface element 110 to access the device native features 112 and display the data retrieved from the device native features 112 on the textbox 108. In some embodiments, the mobile application 106 can be a web application, which runs in a web browser and is created in a browser-supported programming language. In other embodiments, the mobile application 106 can be a hybrid application, which runs on a mobile device (as a native application does) and is written with web-technologies (a browser-supported programming language). For example, the mobile application 106 can be created using a hypertext markup language (HTML), a cascading style sheet (CSS), a scripting language, or any combination thereof. The scripting language may be JavaScript, ECMAScript, etc.

The mobile application 106 is designed to include commands for interacting with device-specific or platform-specific application programming interfaces (APIs) to access one or more of the device's native features 112. In some embodiments, the mobile application 106 can be developed using the Apache Cordova platform available from the Apache Software Foundation. Apache Cordova is a mobile development framework to build a hybrid mobile application using JavaScript, HTML5 and CSS3, instead of device-specific languages. Apache Cordova can be used to add functionality that can be called from JavaScript and thus allow for direct communication between the native layer and the HTML5 page. As such, the mobile application 106 can execute on multiple operating platforms and is configured to access the native device features 112 of the mobile device 102.

In some embodiments, the mobile application 106 can be configured such that the user interface element 110 is shown along with the textbox 108 only when the application 106 is loaded on the mobile device 102. For example, when the mobile application 106 is executed on other computing devices such as desktop computers and laptop computers, the user interface element 110 is not shown in the mobile application 106. Further, in example embodiments, the user interface element 110 is displayed when the mobile application 106 is implemented as a hybrid mobile application. In contrast, when the mobile application 106 is created in a purely web-based application that has no capability of communicating with the native features 112 of the mobile device 102, the user interface element 110 is not shown in the mobile application 106.

Figure 2:
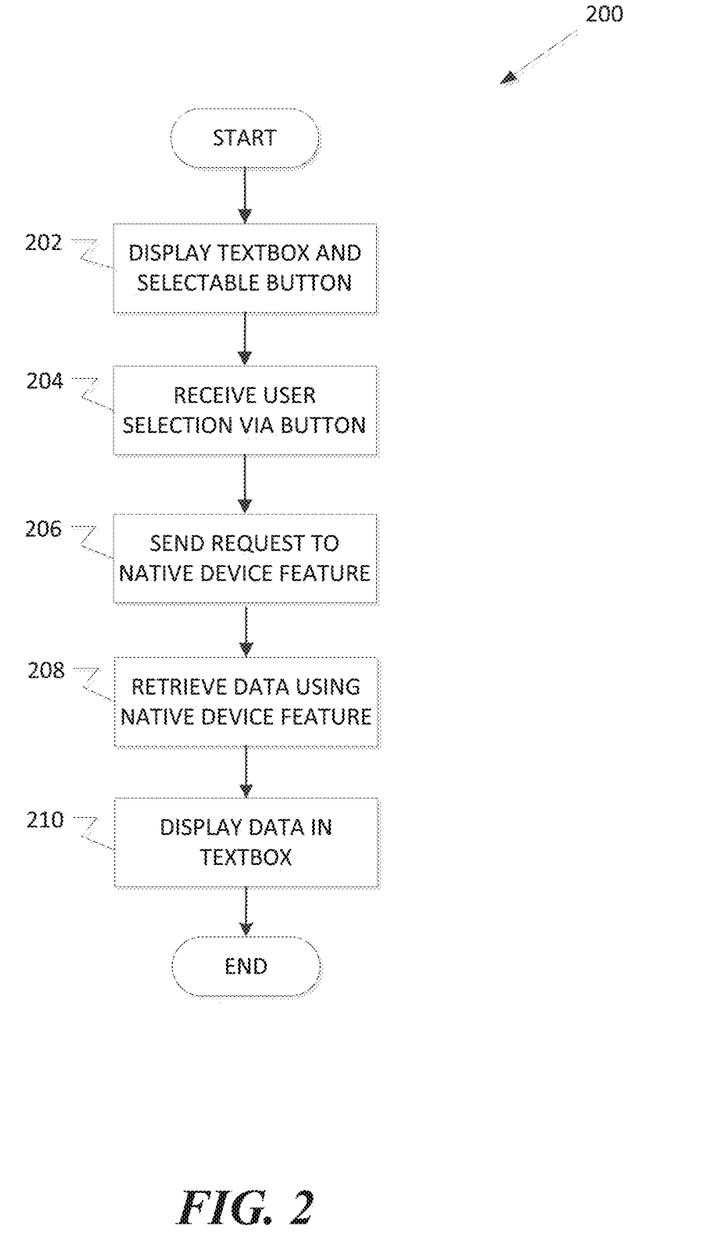
FIG. 2 is a flowchart illustrating an embodiment of a method for retrieving data onto the textbox in the mobile application by means of one or more native features of the mobile device.

FIG. 2 is a flowchart illustrating an embodiment of a method for retrieving data onto the textbox 108 in the mobile application 106 by means of one or more native features 112 of the mobile device 102. In at least some embodiments, the method 200 may be performed by an application or process, such as the mobile application 106, executing on one or more computing devices, such as the mobile device 102. The computing devices can be configured as ones described with reference to FIG. 9. Furthermore, the method may be performed in software, hardware, or a combination of both software and hardware.

In at least some embodiments, the method 200 can begin with operation 202 where the mobile application 106 displays the textbox 108 and the user interface element 110 on the display screen 104, as illustrated in FIG. 1. As illustrated in FIG. 1, the user interface element 110 can be arranged adjacent the textbox 108 (or at least in the same general vicinity on display screen 104) and include an identifier that suggests its function. The identifier can include, for example, a graphical depiction of the type of operation with which the user interface element 110 and textbox 108 are associated (e.g., a book illustrating an address book, or a bar code to illustrate a bar code reader).

At operation 204, the mobile application 106 executing on the mobile device 102 can receive a user selection via the user interface element 110. In some embodiments, the user can interact with the user interface element 110 by touching the user interface element 110 with the user's finger or other tools on the touch-sensitive display screen 104. In other embodiments, the user can use other input devices to select the user interface element 110.

At operation 206, the mobile application 106 operates to send a request for accessing one or more native features 112 of the mobile device 102. The mobile device 102 includes a mobile operating system that operates the mobile device 102. The mobile operating system is configured to implement the mobile device native features 112, such as a touchscreen, cellular, Bluetooth, Wi-Fi, GPS mobile navigation, camera, video camera, speech recognition, voice recorder, music player, near field communication and infrared blaster. Examples of the mobile device platform 102 include Android, iOS, Windows Phone, Blackberry OS. The mobile operating system exposes an interface for the mobile application 106 to communicate with the native features 112. Accordingly, the mobile application 106 can access to the device native features 112 through the interface exposed by the operating system.

Figure 3:
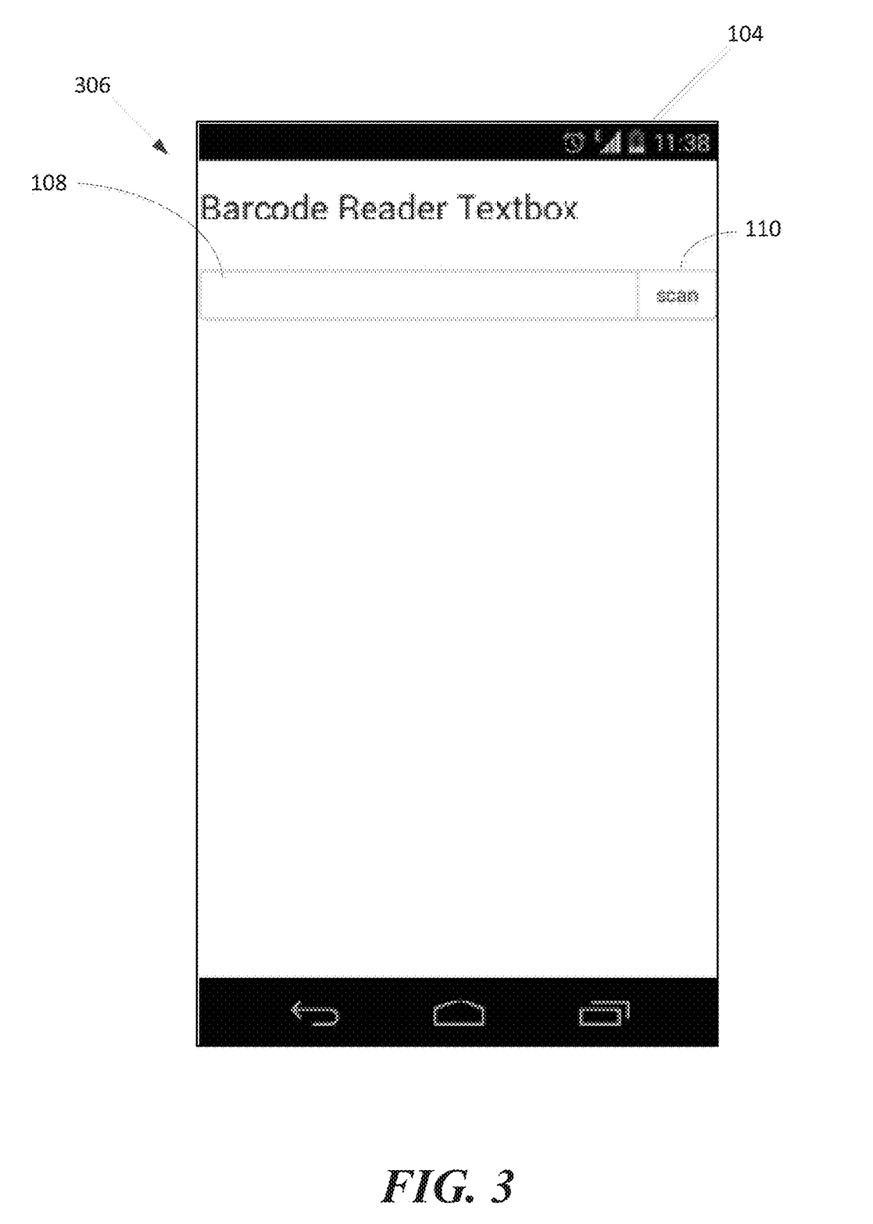
FIG. 3 is a schematic screenshot illustrating one example of the mobile application implemented as a barcode reader application.
Figure 4:
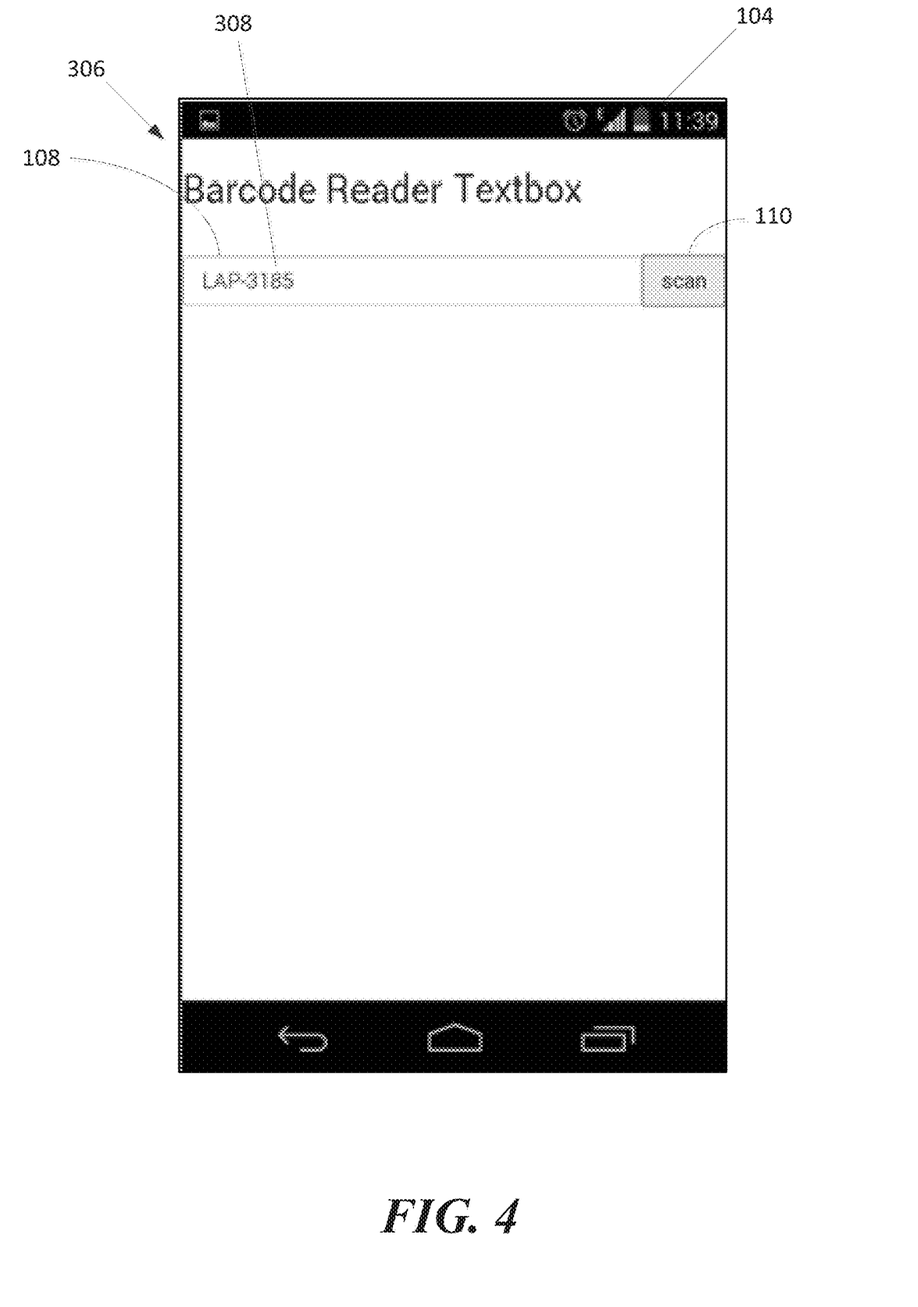
FIG. 4 is another schematic screenshot of the mobile application of FIG. 3.

At operation 208, the mobile application 106 operates to retrieve data using the device native features 112. For example, the retrieved data can be information associated with a barcode (including a QR code) scanned by a camera of the mobile device 102, as illustrated in FIGS. 3 and 4. In other examples, the retrieved data can be one or more contact information selected from a contacts list managed by the mobile device 102, as illustrated in FIGS. 5-8.

At operation 210, the mobile application 106 operates to automatically populate the retrieved data in the textbox 108. In some embodiments, the data can be presented in a text-based form. In other embodiments, the data can be displayed in different formats.

FIGS. 3 and 4 are screenshots illustrating one example of the mobile application 106, which is implemented as a barcode reader application 306. The mobile application 106 as described herein is implemented as the barcode reader application 306, which is designed to access and use a camera of the mobile device 102 to scan a barcode (including a QR code or the like) and retrieve information associated with the barcode on the textbox 108. In other embodiments, the feature of the barcode reader application 306 is incorporated in, and configured as part of, another mobile application 106, which also includes other functions.

In some embodiments, the barcode reader application 306 is developed using Apache Cordova, which is a mobile development framework to build a hybrid mobile application using JavaScript, HTML5 and CSS3, instead of device-specific languages. Apache Cordova can also be extended with native plugins that allows developers to add functionality that can be call from JavaScript and thus allow for direct communication between the native layer and the HTML5 page. In some embodiments, the barcode scanner functionality or plugin can be built upon ZXing, which provides a barcode image processing library for an Android application. ZXing can support scanning major 1D or 2D barcode formats, such as QR codes. In some embodiments, a barcode reader widget can be created in a HTML page by including such a code as: <input type="text" data-role="uuiBarcodeReader"/>.

Referring to FIG. 3, the barcode reader application 306 includes the textbox 108 and the user interface element 110, as described herein. When the application 306 is loaded on the mobile device 102, the textbox 108 and the user interface element 110 are displayed on the display screen 104.

The textbox 108 is configured to receive a barcode information input by a user through an input device, such as a virtual keyboard of the mobile device 102. The textbox 108 is also configured to display information associated with a barcode scanned using a camera of the mobile device 102, as described herein. The barcode information, which is either directly input by the user or obtained via the device camera, can be further processed in a predetermined manner by the barcode reader application 306 and/or other applications.

The user interface element 110 is configured as a selectable graphic user interface on the touch-sensitive display screen 104. The user interface element 110 accompanies the word "SCAN" to indicate the functionality of the user interface element 110.

As described, the application 306 can be configured such that the user interface element 110 is shown along with the textbox 108 only when the application 306 is loaded on the mobile device 102. For example, when the application 306 is executed on other computing devices such as desktop computers and laptop computers, the user interface element 110 is not shown in the application 106. Further, the user interface element 110 is displayed when the barcode reader functionality is implemented as a hybrid mobile application. In contrast, when the barcode reader feature is created in a purely web-based application that has no capability of communicating with the native features 112 of the mobile device 102, the user interface element 110 is not shown in the application 306.

Once a user selects the user interface element 110 by tapping it on the display screen 104, the barcode reader application 306 operates to access the camera of the mobile device 102 and activate the operation of the native feature (e.g., the camera) so that the user scans a barcode through the camera. The functionality of the camera can be fully utilized by the application 306. For example, the camera can be automatically focused on the barcode as the mobile device 102 moves.

When the barcode is taken by the camera, the application 306 operates to retrieve data associated with the scanned barcode. Referring to FIG. 4, the application 306 operates to display the retrieved data on the textbox 108. As depicted, the data can be presented in a text-based format on the textbox 108. In other embodiments, the data can be displayed in other formats.

FIGS. 5-8 are schematic screenshots illustrating another example of the mobile application 106 implemented as a contact search application 316. The mobile application 106 as described herein is implemented as the contact search application 316, which is designed to access the contacts list of the mobile device 102 and retrieve at least part of the contacts stored in the contacts list. In other embodiments, the feature of the contact search application 316 is incorporated in, and configured as part of, another mobile application 106, which also includes other functions.

In some embodiments, similarly to the barcode reader application 306, the contact search application 316 is developed using Apache Cordova. A contact search widget can be created in a HTML page by including such a code as: <input type="tel" data-role="uuiContact"/>.

Referring to FIG. 5, the contact search application 316 includes the textbox 108 and the user interface element 110, as described herein. The textbox 108 is configured to receive a search query input by a user through an input device, such as a virtual keyboard of the mobile device 102. The textbox 108 is also configured to display contact information selected from the contacts list of the mobile device 102, as described below. The contact information displayed on the textbox 108 can be further processed in a predetermined manner by the application 316 and/or other applications. In the depicted embodiment, the user interface element 110 is designed as an add button with a plus or cross symbol. Similarly to the barcode reader application 306, the user interface element 110 can be selectively shown along with the textbox 108 depending on the platform (whether a mobile platform or other computer platform) on which the application 316 is executed, and/or the type (whether a hybrid application or a purely web-based application) of the contact search application 316.

Figure 6:
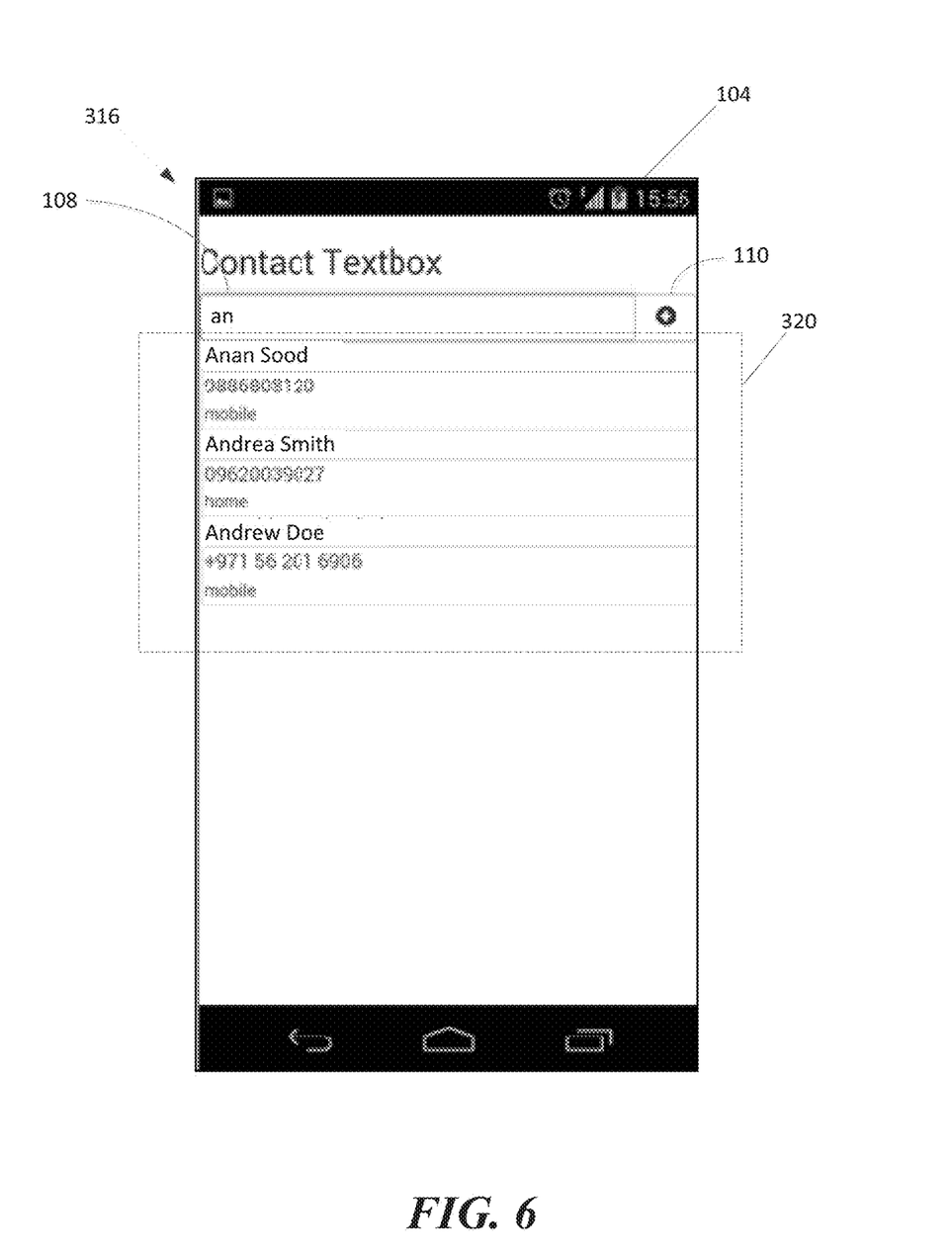
FIG. 6 is another schematic screenshot of the mobile application of FIG. 5.

Referring to FIG. 6, when a user types some characters on the textbox 108, the application 316 operates to display contacts 320 associated with the characters entered on the textbox 108. The contacts 320 are displayed in the application 316 based upon a predetermined manner. For example, the application 316 can display contacts with first names beginning with the entered characters, as illustrated in FIG. 6. In other embodiments, other algorithms can be used. As the characters entered on the textbox 108 change, the contacts displayed in the application 316 can simultaneously change in accordance with the predetermined manner. The displayed contacts 320 are selectable by the user. For example, the user can select one or more of the contacts 320 displayed in the application 316, and the selected contact can be presented on the textbox 108 as shown in FIG. 8.

Figure 7:
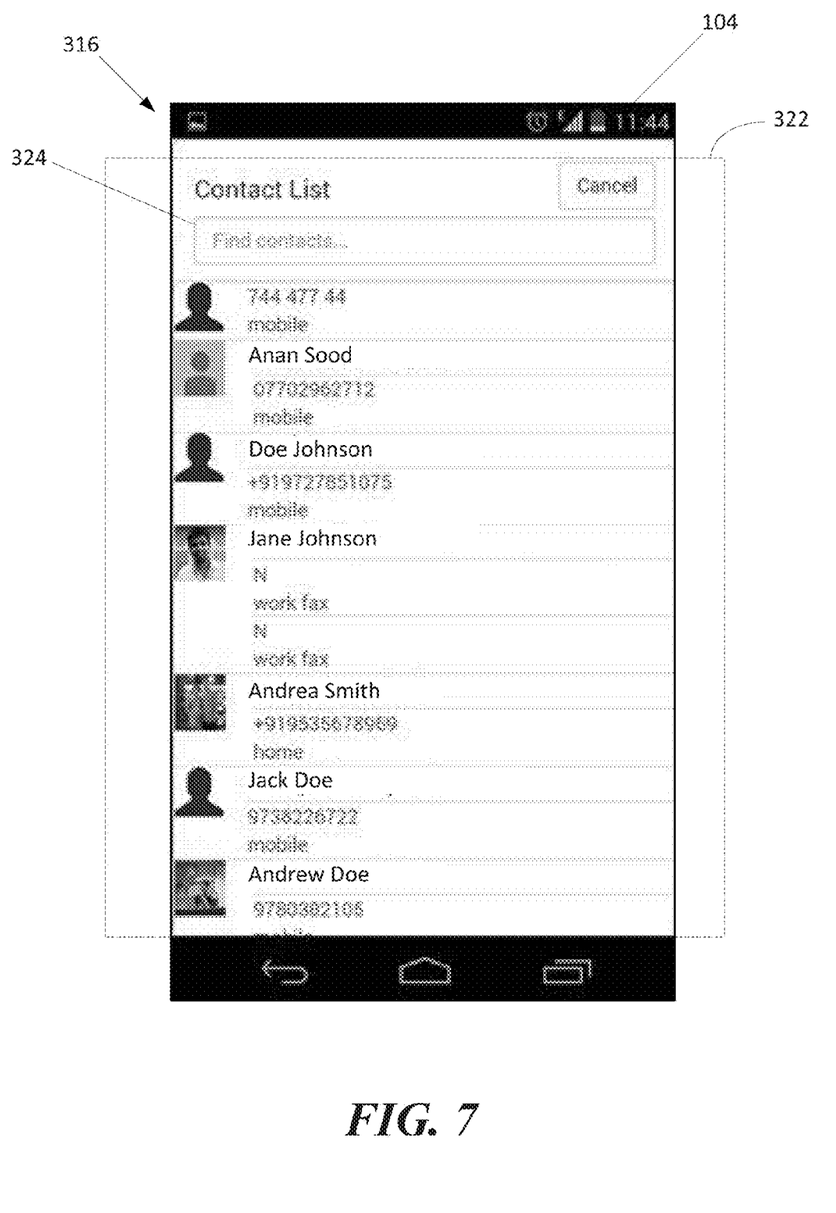
FIG. 7 is yet another schematic screenshot of the mobile application of FIG. 5.

Once a user selects the user interface element 110 by tapping it on the display screen 104, the contact search application 316 can operate to access the contacts list of the mobile device 102, and retrieve the contacts list to display it in the application 316, as illustrated in FIG. 7. The displayed contacts list 322 is designed as a dialog and includes a search field 324 for receiving a search query to search one or more contacts from the displayed contacts list dialog 322. The contacts displayed as the contacts list dialog 322 are selectable by the user. For example, the user can select one or more of the contacts from the contacts list dialog 322, and the selected contact can be displayed on the textbox 108 as shown in FIG. 8.

Figure 8:
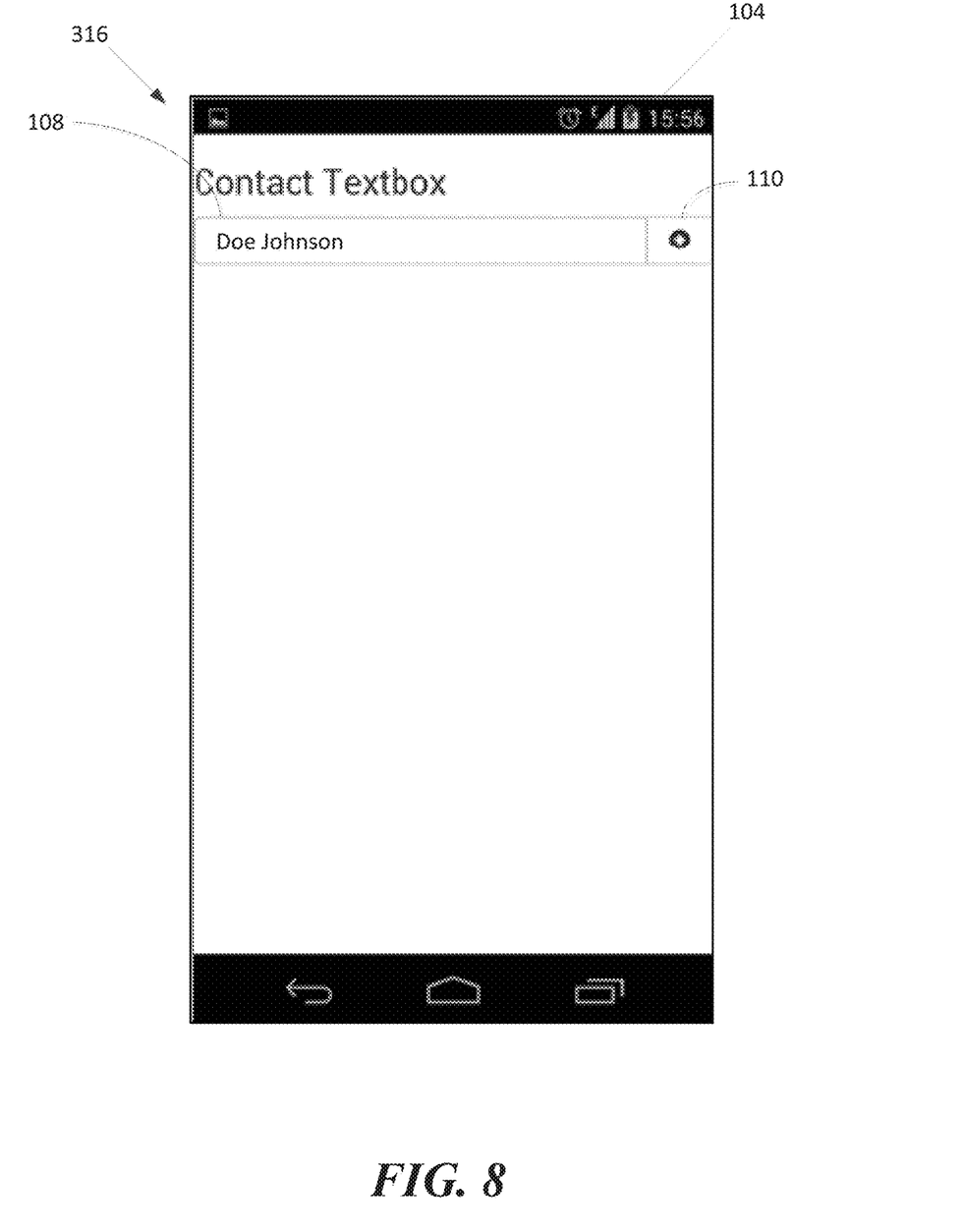
FIG. 8 is yet another schematic screenshot of the mobile application of FIG. 5.

Referring to FIG. 8, the application 316 can operate to automatically display the retrieved contact information on the textbox 108 in response to the user's selection of the user interface element 110 next to the textbox 108. As depicted, the information can be presented in a text-based format on the textbox 108. In other embodiments, the information can be shown in other formats.

Although the mobile application 106 with the textbox 108 and the user interface element 110 are described and illustrated primarily as the barcode reader application 306 and the contact search application 316, the mobile application 106 in accordance with the present teachings can be used for other functions using the device native features 112 through the textbox 108 and the user interface element 110. Examples of such functions include a device GPS location using an incorporated GPS module and/or compass, and any other functions that can be implemented by using one of more device native features.

Figure 9:
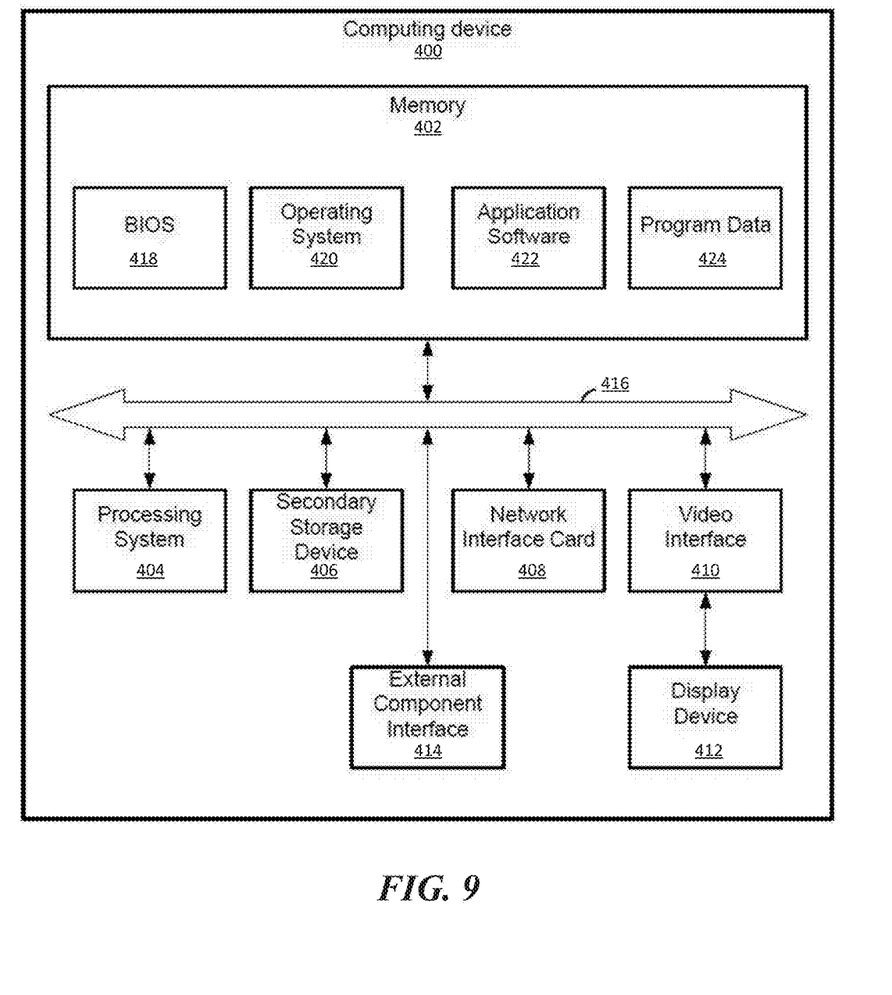
FIG. 9 is a block diagram illustrating example physical details of an electronic computing device, with which aspects of the present disclosure can be implemented.

FIG. 9 is a block diagram illustrating an example computing device 400. In some embodiments, the mobile device 102 and/or a device with the mobile application 106 (including 306 and 316) are implemented as one or more computing devices like the computing device 400. It should be appreciated that in other embodiments, the mobile device 102 and/or a device with the mobile application 106 (including 306 and 316) are implemented using computing devices having hardware components other than those illustrated in the example of FIG. 9.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Accordingly, in the embodiments contemplated herein, computer storage media includes at least some tangible medium or device. In certain embodiments, computer storage media includes entirely non-transitory media and/or devices. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 9, the computing device 400 includes a memory 402, a processing system 404, a secondary storage device 406, a network interface card 408, a video interface 410, a display unit 412, an external component interface 414, and a communication medium 416. The memory 402 includes one or more computer storage media capable of storing data and/or instructions. In different embodiments, the memory 402 is implemented in different ways. For example, the memory 402 can be implemented using various types of computer storage media.

The processing system 404 includes one or more processing units. A processing unit is a physical device or article of manufacture comprising one or more integrated circuits that selectively execute software instructions. In various embodiments, the processing system 404 is implemented in various ways. For example, the processing system 404 can be implemented as one or more processing cores. In another example, the processing system 404 can include one or more separate microprocessors. In yet another example embodiment, the processing system 404 can include an application-specific integrated circuit (ASIC) that provides specific functionality. In yet another example, the processing system 404 provides specific functionality by using an ASIC and by executing computer-executable instructions.

The secondary storage device 406 includes one or more computer storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 includes various types of computer storage media. For example, the secondary storage device 406 can include one or more magnetic disks, magnetic tape drives, optical discs, solid state memory devices, and/or other types of computer storage media.

The network interface card 408 enables the computing device 400 to send data to and receive data from a communication network. In different embodiments, the network interface card 408 is implemented in different ways. For example, the network interface card 408 can be implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display unit 412. The display unit 412 can be various types of devices for displaying video information, such as a cathode-ray tube display, an LCD display panel, a plasma screen display panel, a touch-sensitive display panel, an LED screen, or a projector. The video interface 410 can communicate with the display unit 412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 414 enables the computing device 400 to communicate with external devices. For example, the external component interface 414 can be a USB interface, a FireWire interface, a serial port interface, a parallel port interface, a PS/2 interface, and/or another type of interface that enables the computing device 400 to communicate with external devices. In various embodiments, the external component interface 414 enables the computing device 400 to communicate with various external components, such as external storage devices, input devices, speakers, modems, media player docks, other computing devices, scanners, digital cameras, and fingerprint readers.

The communications medium 416 facilitates communication among the hardware components of the computing device 400. In the example of FIG. 9, the communications medium 416 facilitates communication among the memory 402, the processing system 404, the secondary storage device 406, the network interface card 408, the video interface 410, and the external component interface 414. The communications medium 416 can be implemented in various ways. For example, the communications medium 416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 9, the memory 402 stores a Basic Input/Output System (BIOS) 418 and an operating system 420. The BIOS 418 includes a set of computer-executable instructions that, when executed by the processing system 404, cause the computing device 400 to boot up. The operating system 420 includes a set of computer-executable instructions that, when executed by the processing system 404, cause the computing device 400 to provide an operating system that coordinates the activities and sharing of resources of the computing device 400. Furthermore, the memory 402 stores application software 422. The application software 422 includes computer-executable instructions, that when executed by the processing system 404, cause the computing device 400 to provide one or more applications. The memory 402 also stores program data 424. The program data 424 is data used by programs that execute on the computing device 400.

Overall, a number of advantages of the methods and systems of the present disclosure exist and are described throughout the disclosure. For instance, the system and/or the mobile application in accordance with the present teachings can enhance the feature of a textbox (such as a HTTP textbox) to directly access native features of the mobile device to retrieve data using the device native features, and automatically set or display the retrieved data on the textbox. With this enhanced textbox, the user of the mobile application need not separately run the device native features to obtain a value to be entered on the textbox. The user can simply select the user interface accompanied by the textbox to enter a value on the textbox. As described, the value can be directly, automatically obtained from the device native features. Additional advantages also exist that may not have been explicitly described herein.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for retrieving data on a textbox in a cross-platform mobile application using a native feature of a mobile device, the method comprising:
displaying a user interface element adjacent a textbox in the cross-platform mobile application, the user interface associated with a predetermined native feature of the mobile device;
receiving a user input through the user interface element including a graphical icon, visual indicator, and text-based interfaces and have different designs in accordance with functionalities of the user interface element;
accessing the predetermined native feature of the mobile device corresponding to the user input received from the user interface element; and
displaying information associated with the predetermined native feature of the mobile device in the textbox.

2. The method of claim 1, wherein the cross-platform mobile application is a hybrid application.

3. The method of claim 1, wherein the predetermined native feature is a camera incorporated in the mobile device.

4. The method of claim 3, wherein the cross-platform mobile application includes a barcode reader feature.

5. The method of claim 4, further comprising:
prompting a user to obtaining a photograph of a barcode through the camera of the mobile device,
wherein displaying information associated with the predetermined native feature comprises displaying a value associated with the barcode on the textbox.

6. The method of claim 1, wherein the predetermined native feature is a contact list of the mobile device.

7. The method of claim 6, wherein the textbox is a contact search textbox configured to enable a user to enter a search query for searching one or more contacts from the contact list of the mobile device.

8. The method of claim 6, wherein displaying information associated with the predetermined native feature comprises displaying at least part of contacts of the contact list in the cross-platform mobile application.

9. The method of claim 8, wherein displaying at least part of contacts of the contact list comprises displaying a textbox configured to enable a user to input a query term therein for searching one or more items from the at least part of contacts.

10. The method of claim 8, wherein the at least part of contacts are selectable by a user.

11. A system for retrieving data using a native feature of a mobile device in a cross-platform mobile application, the system comprising:
at least one processing unit;
a display screen; and
memory storing computing executable instructions that, when executed by the at least one processing unit, cause the at least one processing unit to:
display a user interface element element including a graphical icon, visual indicator, and text-based interfaces and have different designs in accordance with functionalities of the user interface element adjacent a textbox on the display screen, the user interface element associated with a predetermined native feature of the mobile device;
receive a user selection of the user interface;
access the predetermined native feature of the mobile device; and
display information associated with the predetermined native feature of the mobile device in the textbox.

12. The method of claim 11, wherein the predetermined native feature is a camera incorporated in the mobile device.

13. The method of claim 12, wherein the cross-platform mobile application includes a barcode reader feature.

14. The method of claim 13, further comprising:
prompting a user to obtaining a photograph of a barcode through the camera of the mobile device,
wherein displaying information associated with the predetermined native feature comprises displaying a value associated with the barcode on the textbox.

15. The method of claim 11, wherein the predetermined native feature is a contact list of the mobile device.

16. The method of claim 15, wherein the textbox is a contact search textbox configured to enable a user to enter a search query for searching one or more contacts from the contact list of the mobile device.

17. The method of claim 15, wherein displaying information associated with the predetermined native feature comprises displaying at least part of contacts of the contact list in the cross-platform mobile application.

18. The method of claim 17, wherein displaying at least part of contacts of the contact list comprises displaying a textbox configured to enable a user to input a query term therein for searching one or more items from the at least part of contacts.

19. The method of claim 17, wherein the at least part of contacts are selectable by a user.

20. A computer data product containing encoded data stored within a non-transitory storage media that when executed by at least one processor, perform a method of retrieving data in a cross-platform mobile application, the method comprising:
displaying a user interface element adjacent a textbox in the cross-platform mobile application, the user interface associated with a predetermined native feature of the mobile device;
receiving a user input through the user interface element including a graphical icon, visual indicator, and text-based interfaces and have different designs in accordance with functionalities of the user interface element;

accessing the predetermined native feature of the mobile device corresponding to the user input received from the user interface element; and displaying information associated with the predetermined native feature of the mobile device in the textbox.

* * * * *